(12) United States Patent
Gadzella et al.

(10) Patent No.: US 8,011,439 B2
(45) Date of Patent: Sep. 6, 2011

(54) MARKER ASSEMBLY HAVING SPRING LINKAGE TO LIMIT MOMENTUM IN MARKER ASSEMBLY DURING MARKER ASSEMBLY DEPLOYMENT

(75) Inventors: Gerry Gadzella, Saskatoon (CA); Terrance A. Friggstad, Grasswood (CA); Dennis G. Thompson, Saskatoon (CA); Ryan R. Georgison, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/493,964

(22) Filed: Jun. 29, 2009

(65) Prior Publication Data

US 2010/0200256 A1 Aug. 12, 2010

Related U.S. Application Data

(60) Provisional application No. 61/151,405, filed on Feb. 10, 2009.

(51) Int. Cl.
*A01B 17/00* (2006.01)
(52) U.S. Cl. ........................................ 172/126
(58) Field of Classification Search ................ 172/126, 172/127, 128, 129
See application file for complete search history.

(56) References Cited

U.S. PATENT DOCUMENTS

| | | | |
|---|---|---|---|
| 976,771 A | 11/1910 | Artz | |
| 2,031,463 A | 2/1936 | Choate et al. | |
| 2,498,888 A | 2/1950 | Hyland et al. | |
| 3,072,200 A * | 1/1963 | Yerkes | 172/126 |
| 3,094,172 A | 6/1963 | Ose et al. | |
| 3,250,333 A | 5/1966 | Day | |
| 3,520,373 A | 7/1970 | Stinemetz | |
| 3,666,019 A | 5/1972 | Yeske | |
| 3,833,066 A | 9/1974 | Hitt | |
| 3,972,476 A | 8/1976 | Hall | |
| 4,030,551 A | 6/1977 | Boetto et al. | |
| 4,058,170 A | 11/1977 | Ankenman et al. | |
| 4,074,766 A | 2/1978 | Orthman | |
| 4,207,950 A * | 6/1980 | Kinzenbaw | 172/126 |
| 4,244,428 A | 1/1981 | Sloan | |
| 4,360,066 A | 11/1982 | Mann | |
| 4,368,806 A | 1/1983 | Raineri | |
| 4,425,857 A | 1/1984 | Lienemann et al. | |
| 4,449,590 A | 5/1984 | Williamson | |
| 4,449,725 A | 5/1984 | Robison et al. | |

(Continued)

FOREIGN PATENT DOCUMENTS

EP 114983 8/1984

*Primary Examiner* — Thomas B Will
*Assistant Examiner* — Joel Mitchell
(74) *Attorney, Agent, or Firm* — Rebecca Henkel; Sue Watson

(57) ABSTRACT

A marker assembly includes a first linkage section interconnected to a second linkage section by a pivoting joint. The pivoting joint also includes a spring linkage that limits momentum in the second linkage section before a marking disc carried by the second linkage section engages the ground. The spring linkage may be comprised of a spring that is retained by a pair of washers within a housing or canister. A linkage rod passes through the canister and has a set of nuts that are sized to catch the washers. Thus, if the spring linkage is compressed or extended, the catch nuts press up against the washers thereby compressing the spring. By compressing the spring, a force is applied in the opposite direction as the momentum in the marker assembly, which reduces the collective momentum in the marker assembly during deployment.

10 Claims, 10 Drawing Sheets

U.S. PATENT DOCUMENTS

| | | | |
|---|---|---|---|
| 4,467,872 A | 8/1984 | Hodapp | |
| 4,526,236 A | 7/1985 | Jacobsen | |
| 4,530,405 A | 7/1985 | White | |
| 4,570,722 A | 2/1986 | Osborn | |
| 4,632,417 A | 12/1986 | Hodapp | |
| 4,634,051 A | 1/1987 | Dudley | |
| 4,660,651 A | 4/1987 | Pfenninger et al. | |
| 4,674,578 A | 6/1987 | Bexten et al. | |
| 4,790,389 A | 12/1988 | Adee et al. | |
| 4,825,957 A * | 5/1989 | White et al. | 172/126 |
| 4,825,958 A | 5/1989 | Kelderman | |
| 4,878,545 A | 11/1989 | Dyken | |
| 4,923,017 A | 5/1990 | Meek et al. | |
| 4,944,355 A | 7/1990 | Karchewski | |
| 4,986,367 A | 1/1991 | Kinzenbaw | |
| 5,248,091 A | 9/1993 | Thyberg | |
| 5,253,717 A | 10/1993 | Roush et al. | |
| 5,291,954 A | 3/1994 | Kirwan | |
| 5,379,847 A | 1/1995 | Snyder | |
| 5,425,427 A | 6/1995 | Haugen | |
| 5,485,796 A | 1/1996 | Bassett | |
| 5,573,070 A | 11/1996 | Meek et al. | |
| 5,660,237 A | 8/1997 | Boyko et al. | |
| 5,921,325 A | 7/1999 | Meek et al. | |
| 5,953,894 A | 9/1999 | Aron et al. | |
| 5,957,216 A | 9/1999 | Redekop | |
| 5,992,534 A | 11/1999 | Callies et al. | |
| 6,027,039 A | 2/2000 | Mercil | |
| 6,079,114 A | 6/2000 | Toews | |
| 6,082,467 A | 7/2000 | Friesen | |
| 6,119,963 A | 9/2000 | Bastin et al. | |
| 6,125,944 A | 10/2000 | Redekop | |
| 6,257,343 B1 | 7/2001 | Maenle et al. | |
| 6,334,491 B1 | 1/2002 | Nevin | |
| 6,374,923 B1 | 4/2002 | Friggstad | |
| 6,382,327 B1 | 5/2002 | Mosdal | |
| 6,397,952 B1 | 6/2002 | Hundeby | |
| 6,611,993 B2 | 9/2003 | Ray | |
| 6,708,775 B2 | 3/2004 | Beaujot | |
| 6,889,915 B2 | 5/2005 | Guesdon | |

\* cited by examiner

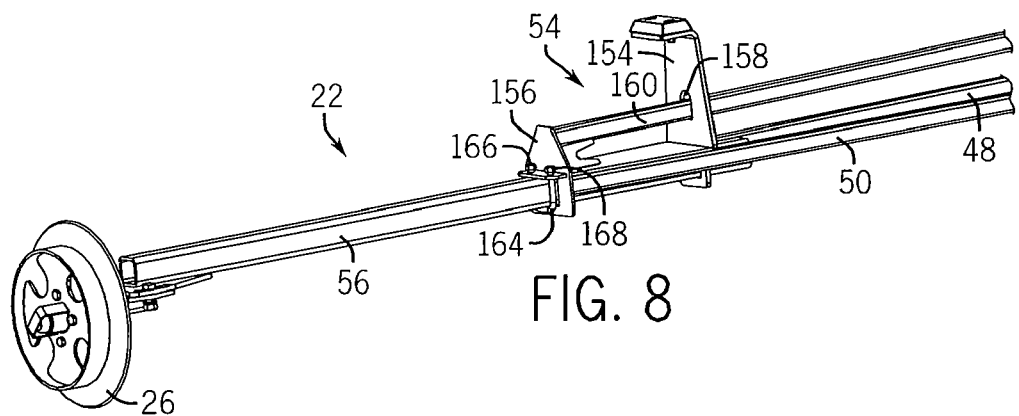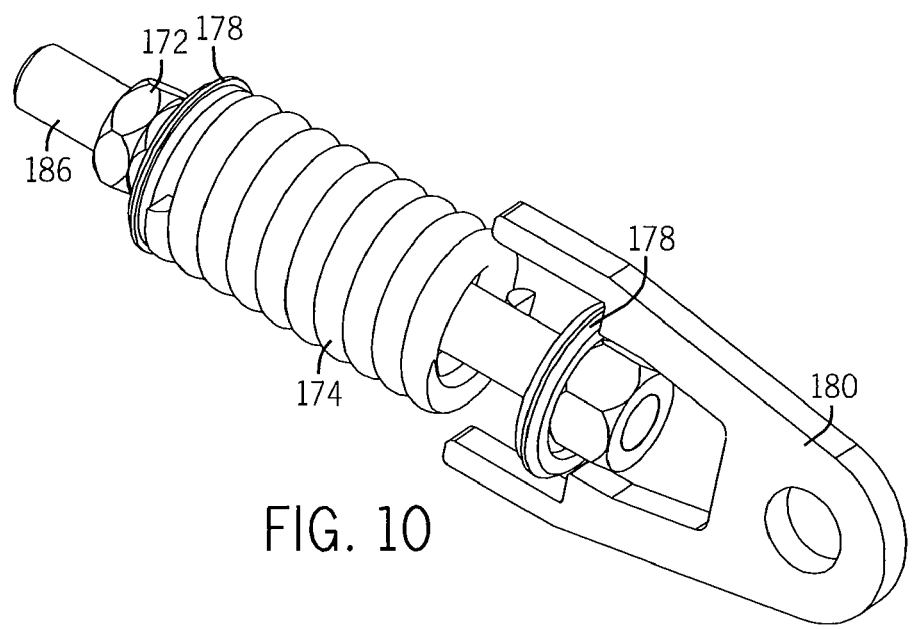

MARKER ASSEMBLY HAVING SPRING LINKAGE TO LIMIT MOMENTUM IN MARKER ASSEMBLY DURING MARKER ASSEMBLY DEPLOYMENT

CROSS-REFERENCE TO RELATED APPLICATION

The present application claims the benefit of U.S. Ser. No. 61/151,405, filed Feb. 10, 2009.

BACKGROUND OF THE INVENTION

The present invention relates generally to agricultural implements and, more particularly, to a marker assembly having a spring linkage that limits momentum in the marker assembly during deployment of the marker assembly from a folded, stow position to an extended, working position.

Agricultural seeders, which are commonly used to deposit seed, fertilizer, and granular chemicals onto a farm field, generally consist of a towable frame that supports one or more rows of seed units. Seed or other granular product is typically metered to the seed units which in turn deposit the product onto the farm field. The seeder will often include furrowing opening devices, such as coulters, knives, shanks, and the like that cut a furrow into the farm field immediately ahead of the seed units so that the granular product is deposited into a furrow rather than simply atop the farm field. A trailing packer will then pack the furrow to improve germination and/or fertilization.

Agricultural seeders are also commonly outfitted with a pair of marker assemblies. Each marker assembly will generally include a marker frame which carries a marking disc. A seeder will typically have a marker frame extending laterally on opposite sides of the seeder, and the marker frames can be independently raised and lowered by a respective lift assembly, such as a hydraulic cylinder. The marking disc is designed to cut a furrow into the farm field which serves as a marker as to the position of the seeder as the field was passed. Thus, during a subsequent pass of the farm field, the operator can position the seeder so that the next pass is properly aligned with the previous seeding pass to prevent overseeding of a previously seeded area or to prevent undesirable gaps in the seeded rows. Improper uniformity in spacing of the rows as well as distribution of the seed can negatively impact crop yields.

Increasingly, there is a desire for a foldable or collapsible marker assembly that can be retracted from an extended, working position to a folded position for transport and storage. One proposed foldable marker assembly has a frame consisting of a series of interconnected linkages that can pivot with respect to one another. An actuator, such as a hydraulic cylinder, may retract the linkages or extend the linkages depending upon the desired orientation for the marker assembly. One of the drawbacks of such retractable and extendable marker assemblies is that tremendous momentum can build up in the linkages as the marker frame is rapidly deployed. This momentum can result in the marking disc impacting the ground at an undesirable speed and undesirable force.

Therefore, there is a need for a marker assembly in which the momentum in the linkages can be reduced prior to engagement of the marking disc with the soil surface.

SUMMARY OF THE INVENTION

The present invention is directed to a marker assembly for use with an agricultural implement and having means for reducing momentum in the marker assembly as the marker assembly is being deployed to a working position.

In one embodiment, the marker assembly is comprised of a first linkage section interconnected to a second linkage section by a pivoting joint. The pivoting joint also includes a spring linkage that limits momentum in the second linkage section before a marking disc carried by the second linkage section engages the ground. In one embodiment, the spring linkage is comprised of a spring that is retained by a pair of washers within a housing or canister. A linkage rod passes through the canister and has a set of nuts that are sized to catch the washers. Thus, if the spring linkage is compressed or extended, the catch nuts press up against the washers thereby compressing the spring. By compressing the spring, a force is applied in the opposite direction as the momentum in the marker assembly, which reduces the collective momentum in the marker assembly during deployment.

It is therefore an object of the invention to provide a marker assembly that can be rapidly deployed without causing damage to the marking disc.

It is another object of the invention to provide a marker assembly that can be rapidity deployed without comprising the outer portions of the marker assembly ability to follow ground contours during deployment.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 8 is an view of the outer frame section of the marker assembly of FIG. 1;

FIG. 10 is an isometric view of a spring link for use with the marker assembly of FIG. 1 according to one embodiment of the present invention.

DETAILED DESCRIPTION OF THE INVENTION

Figure 1:
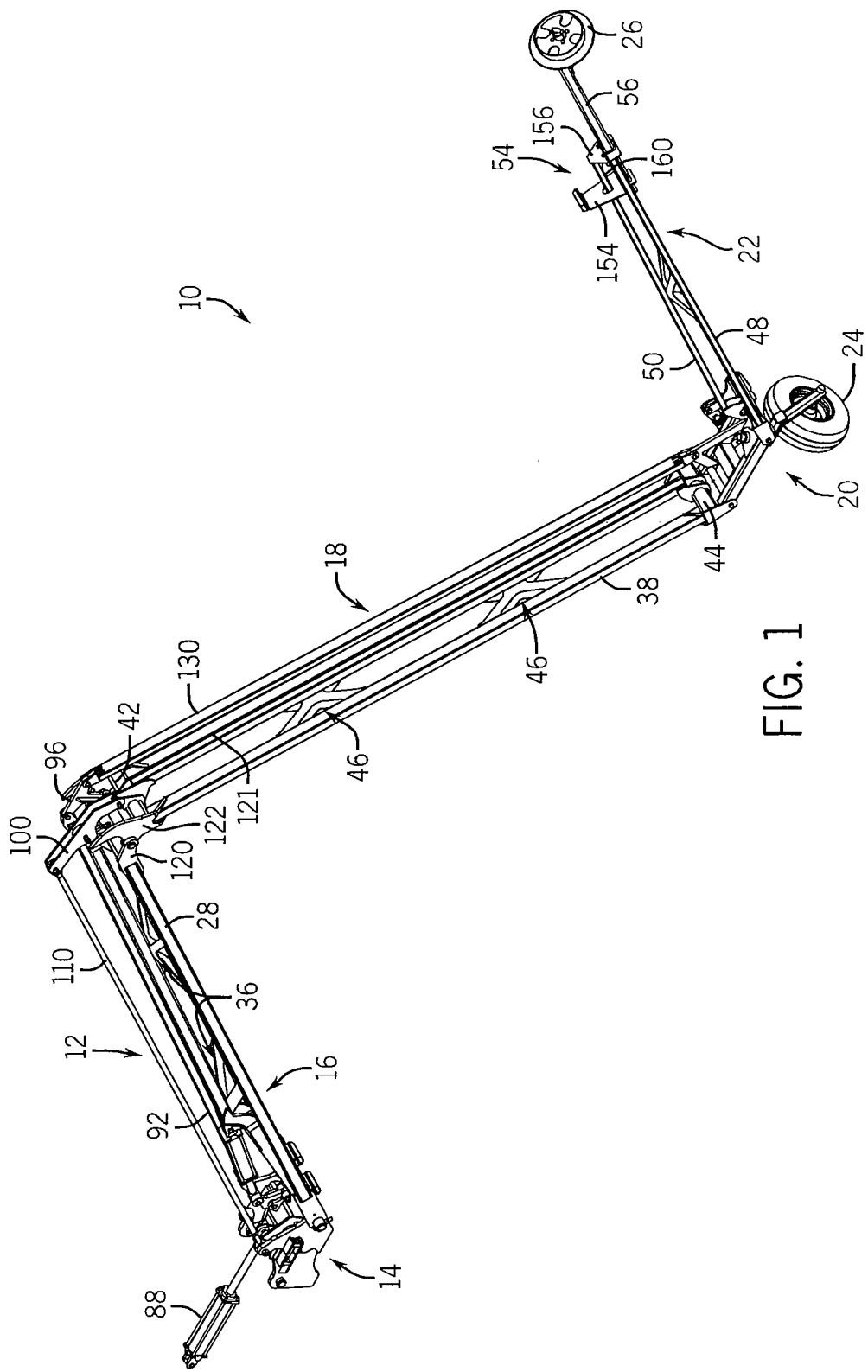
FIG. 1 is an isometric view of a marker assembly according to one embodiment of the invention.

The present invention is directed to a marker assembly 10, shown in FIG. 1 in a partially deployed position, for use with an agricultural implement, such as a seeder (not shown). The marker assembly is generally comprised of a multi-linked frame 12 that includes a mounting assembly 14, an inner frame section 16, a central frame section 18, a caster wheel assembly 20, and an outer frame section 22. Each of these will be described in greater detail below. As will become apparent from the following description, the marker assembly 10 is designed to be folded into a transport or stow position and may be extended to a working position. FIG. 1 shows the marker assembly in a pre-deployment position in which the linkage sections 16, 18, and 22 are partially extended. The marker assembly 10 is generally supported by its connection to the frame (not shown) of the agricultural implement and a wheel 24, which is free to caster as will be described. The outer frame section 22 carries a marking disc 26 designed to cut a marking furrow into the soil as the agricultural implement is being towed with the marking disc 26 in a ground engaging position. As will be described more fully below, the distance of the marking disc 26 from the agricultural implement may be varied to provide a user some flexibility in establishing the spacing of the marking furrow from the agricultural implement.

The inner linkage section 16 is generally defined by a pair of spaced but parallel frame tubes 28, 30 connected at one end by a cross tube 32 connected at an opposite end by a cross tube 34. To provide additional stability for the inner frame section, tubes 28, 30 are connected to one another by a series of intersecting plates, generally referenced 36. It is understood that other stability arrangements other than those shown in the figures may be used.

The central frame section 18 also includes a pair of elongate tubes 38, 40 interconnected by a pair of cross tubes 42, 44. A series of intersecting members 46 also extend between the tubes 38, 40 to provide additional structural integrity to the central frame section 18.

The outer frame section 22 includes a pair of elongate tubes 48, 50 that are angled toward one another and are interconnected at one end by a cross tube 52 and another end by a retainer 54. As will be described more fully below, the retainer 54 interconnects tubes 48, 50 to a telescoping tube 56, to which marking disk 26 is connected.

The aforementioned linkage sections will be described in greater detail below with reference to FIGS. 2 through 10.

Figure 2:
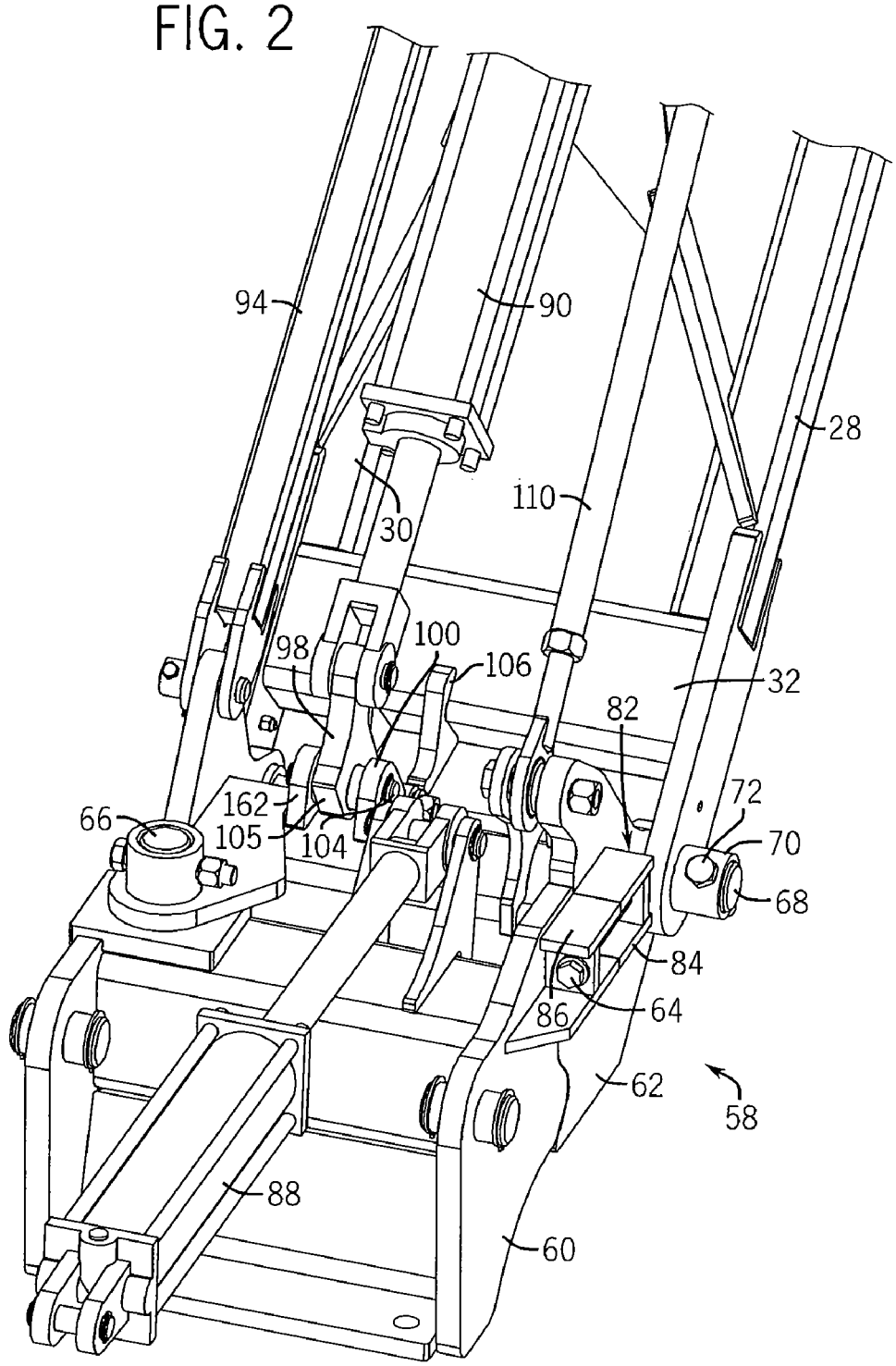
FIG. 2 is a side isometric view of a mounting end of the marker assembly shown in FIG. 1.
Figure 3:
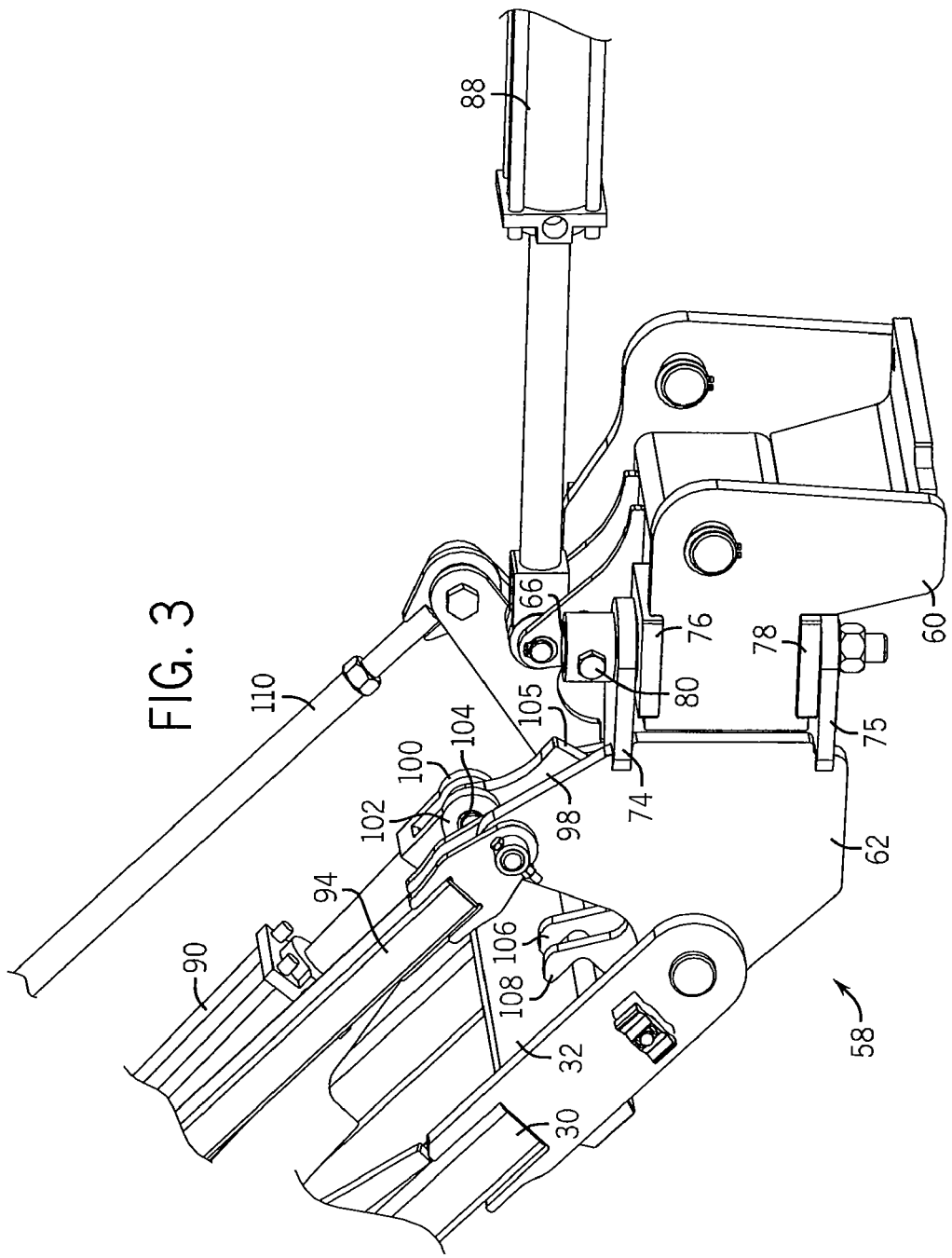
FIG. 3 is a rear top isometric view of the mounting end of the marker assembly shown in FIGS. 1 and 2.

FIGS. 2 and 3 are partial front top perspective and partial rear top isometric views of the marker assembly 10 and, more particularly, the mounting assembly 14 and the connection of the inner frame section 16 to the mounting assembly 14. The mounting assembly 14 includes a knuckle 58 comprised of an inner knuckle member 60 and an outer knuckle member 62. The inner knuckle member 60 is mountable to the frame of the agricultural implement in a conventional manner and the outer knuckle member 62 is connected to the inner knuckle member 60 by a tension bolt 64 and a vertically oriented pin 66. The tubes 28, 30 are secured to the outer knuckle member 62 by a shaft 68 that is passed through openings (not numbered) in the tubes 28, 30 and through the cross tube 32. The shaft 68 fits within a boss 70 at the side of the tube 28 and a cross bolt 72 is passed through openings in the shaft 68 and the boss 70 to secure the shaft 68 to the boss 70 and thus to the tube 28.

Figure 3A:
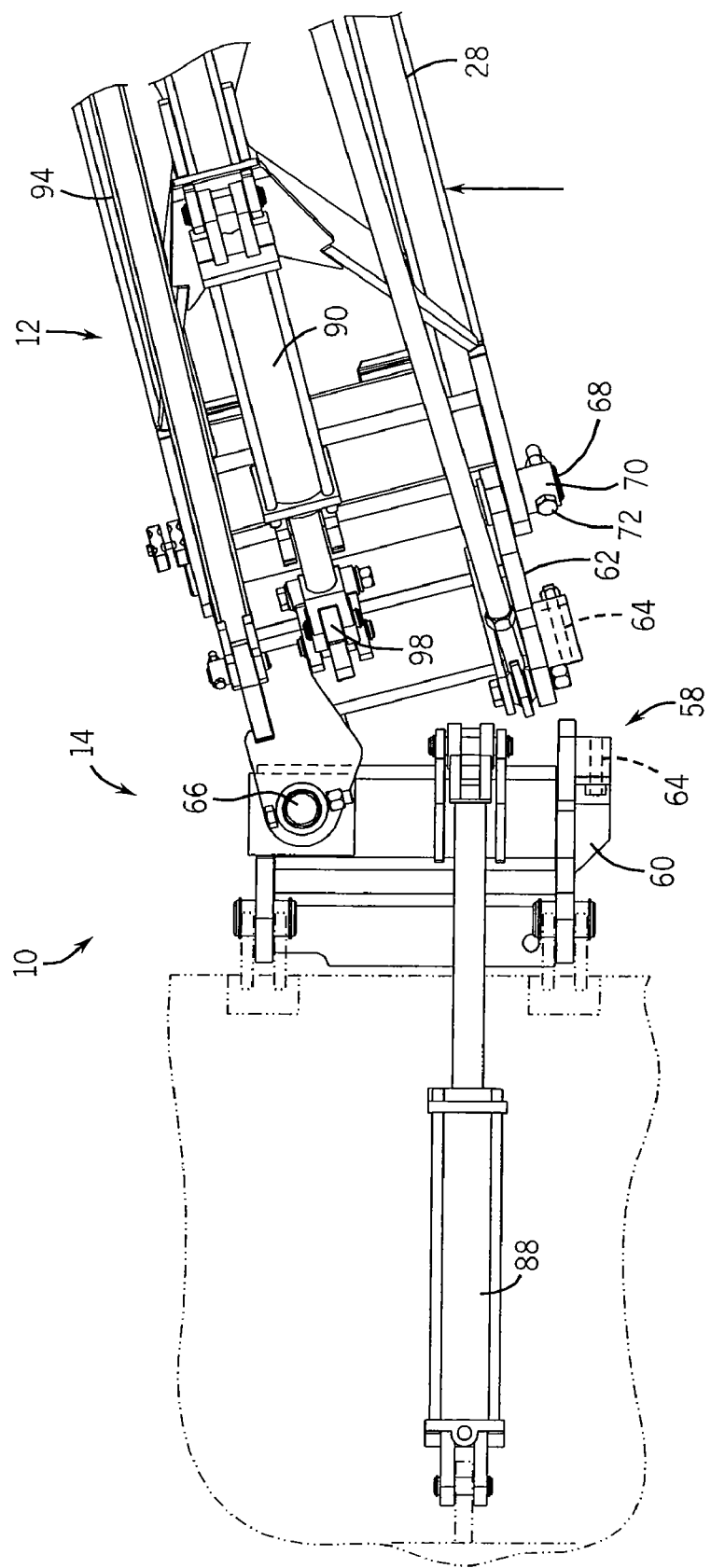
FIG. 3A is a top plan view of the marker assembly shown in a breakaway position according to one aspect of the invention.

As shown particularly in FIG. 3, the outer knuckle member 62 has a top ear 74 and a bottom ear 75 that fit over lateral plates 76, 78 of the inner knuckle member 60. The lateral plates 76, 78 and the ears have openings (not numbered) that when aligned allow for vertical pivot pin 66 to be dropped into a passage (not shown) formed in the inner knuckle member 60. The vertical pivot 66 is secured to the inner knuckle member 60 by bolt 80. The connection of the inner and outer knuckle members 60, 62 allows the outer knuckle member 62 to pivot relative to inner knuckle member 60 in a generally rearward direction and about a vertical axis defined by the vertical pin 66, as shown in FIG. 3A.

That is, the knuckle 58 is designed so that the outer knuckle member 62, and the inner frame section 16 connected thereto, can rotate in a rearward direction (opposite the direction of travel of the implement). Such rotation is permitted when the tension bolt 64 breaks. The tension bolt 64 is carried by a bolt housing 82 that is defined by an outer housing portion 84 and an inner housing portion 86. The outer housing portion 84 extends from a side of the outer knuckle member 62 and the inner housing portion 86 extends from a side of the inner knuckle member 60. Other than the pivot pin connection described above, the only other connection of the inner and outer knuckle members is by the tension bolt 64 that connects the inner and outer housing portions. When the tension bolt breaks 64, those housing portions become separated, which allows the inner linkage 16, as well as, the other linkages, to pivot rearwardly. The tension bolt 64 is designed to fail, e.g., break, when the deployed marker assembly 10 encounters a field obstruction with sufficient force to overcome the integrity, e.g., tensile force, of the tension bolt 64. When such an obstruction is encountered, the implement will continue to move in a forward direction and will try to pull the marker assembly "through" the obstruction. This can lead to damage in the implement and the marker assembly. As such, the present invention allows the marker assembly 10 to pivot rearward so as to clear the obstruction, if the obstruction is massive enough to cause failure of the tension bolt 64.

As noted above, the marker assembly 10 is designed to be folded into a transport or stow position and may then be extended from such a position to a working position. This aforementioned movement is controlled by a pair of actuators 88, 90, e.g., cylinders. Actuator 88 is designed to move the marker assembly 10 from an upright retracted position to a horizontal stow position for transport and storage. Actuator 90 on the other hand is designed to extend and retract the marker assembly 10. The actuator 90 is connected to the upper link 92, which in turn is connected to cross tube 34 of the inner frame section.

Figure 4:
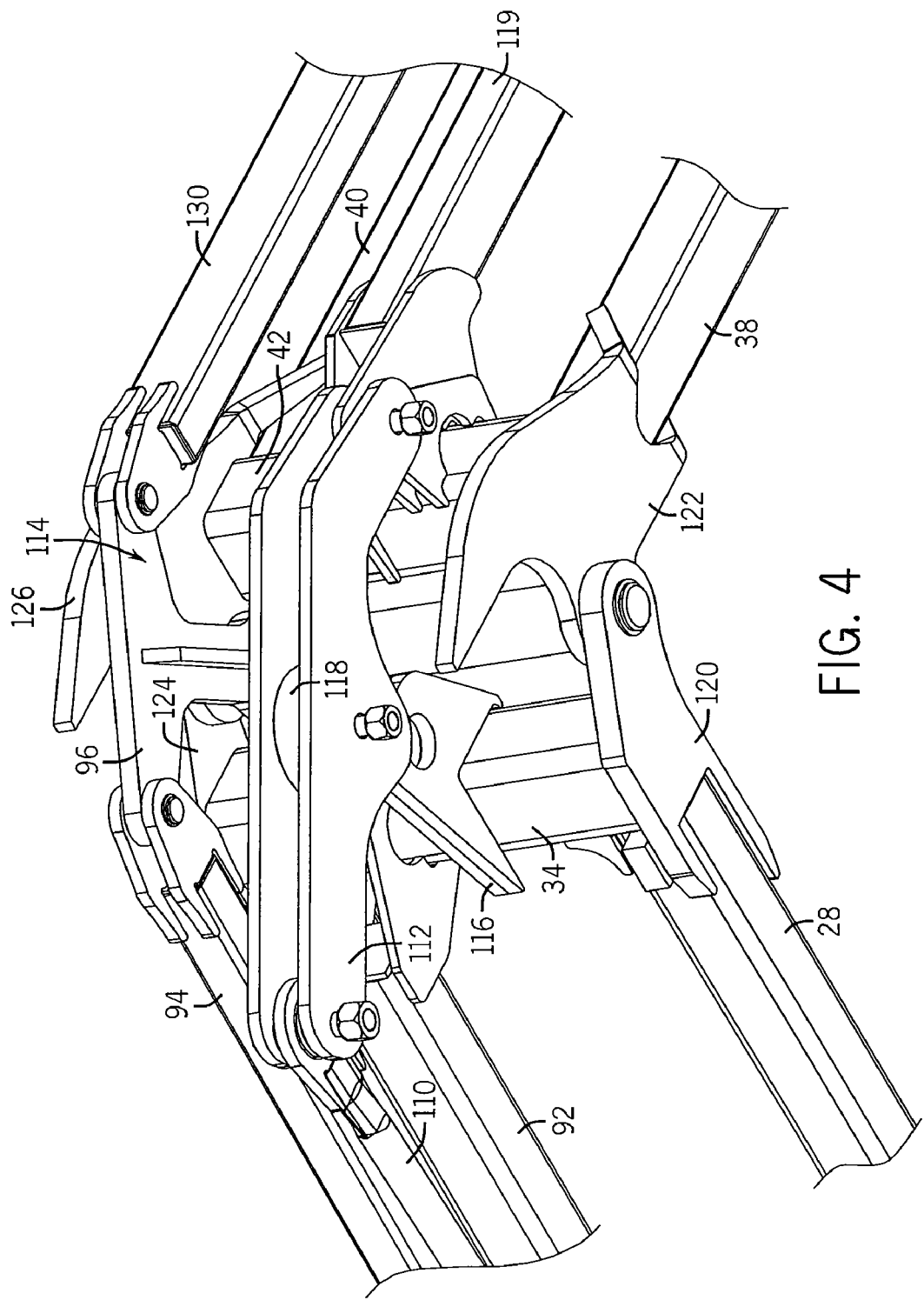
FIG. 4 is a top isometric view of the interconnection of the inner frame section and central frame section of the marker assembly of FIG. 1.

The inner frame section 16 also includes a parallel link 94 that is connected at one end to the outer knuckle member 62 in a conventional manner and is connected at the opposite end to a bridge link 96, as shown in FIG. 4, which will be described more fully below. As will be also be described more fully below, when the actuator 90 is extended, the parallel link 92 is also extended which, in effect, causes a lowering of the inner frame section 16. Because of counterpart parallel links in the central frame section 18, extension of the actuator 90 also causes extension and lowering of the central frame section 18, which in turn causes a lowering of the outer frame section 22. Retraction of the cylinder 90 results in the linkages being retracted to an upright retracted position.

Referring again to FIGS. 2 and 3, the marker assembly 10 also includes a float link 98 that connects the outer knuckle member 62 and the cylinder 90. The float link 98 is bolted to a pair of arms 100, 102 formed with and extending upwardly from the outer knuckle member 62. The bolt 104 effectively forms a pivot which allows the float link 98 to rotate to accommodate the motion of the marker assembly 10 in response to ground contours. A bottom surface 105 of the float link 98 limits how far the float link 98 may pivot and optional bumpers 106, 108 mounted to cross tube 32 may be used to limit downward movement of the float link 98. In a preferred embodiment, the float link 98 allows 30 degrees of vertical movement in response to surface contours with preferably 15 degrees of lift and 15 degrees of lower relative to a neutral position. The inner frame section 16 also has a rigid link 110 that is connected at one end to the outer knuckle member 62 in a conventional manner and is connected at the opposite end to a lever arm 112, as also shown in FIG. 4. The lever arm 112 forms part of a cam and roller assembly 114 that further includes a cam 116 and a cam roller 118. The cam 116 is interconnected to the cross tube 34 and the cam roller 118. The lever arm 112 is also connected to a center link 119 of the central frame section 18.

During deployment of the marker assembly 10, there is a point at which the wheel 24 will engage the surface and move outwards away from the implement. The point where the wheel 24 engages the surface is set by the rigid link 110 and the cam assembly 114. That is, the rigid link 110 pulls down on the lever arm 112 causing the central frame section 18 to move away from the inner frame section 16. The amount the central frame section 18 moves away is determined by the profile of the cam 116. The cam roller 118 follows the cam profile changing the distance the lever arm 112 is away from the inner section 16. This variation in distance provides control of the distance at which the wheel 24 engages the soil surface. Moreover, the cam assembly 114 provides gradual increases in the loading of the rigid link 110.

Figure 5:
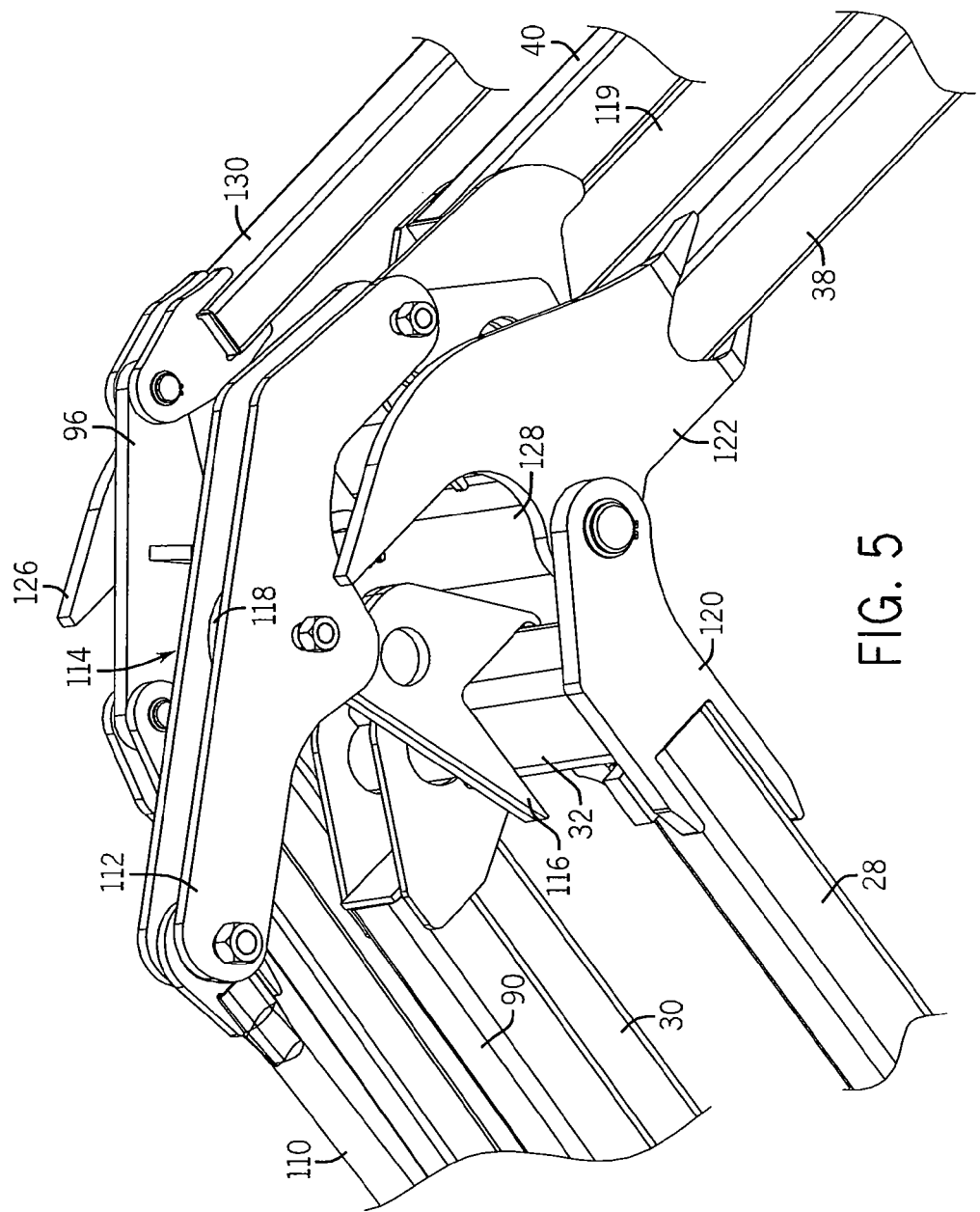
FIG. 5 is a side isometric view of that shown in FIG. 4.
Figure 6:
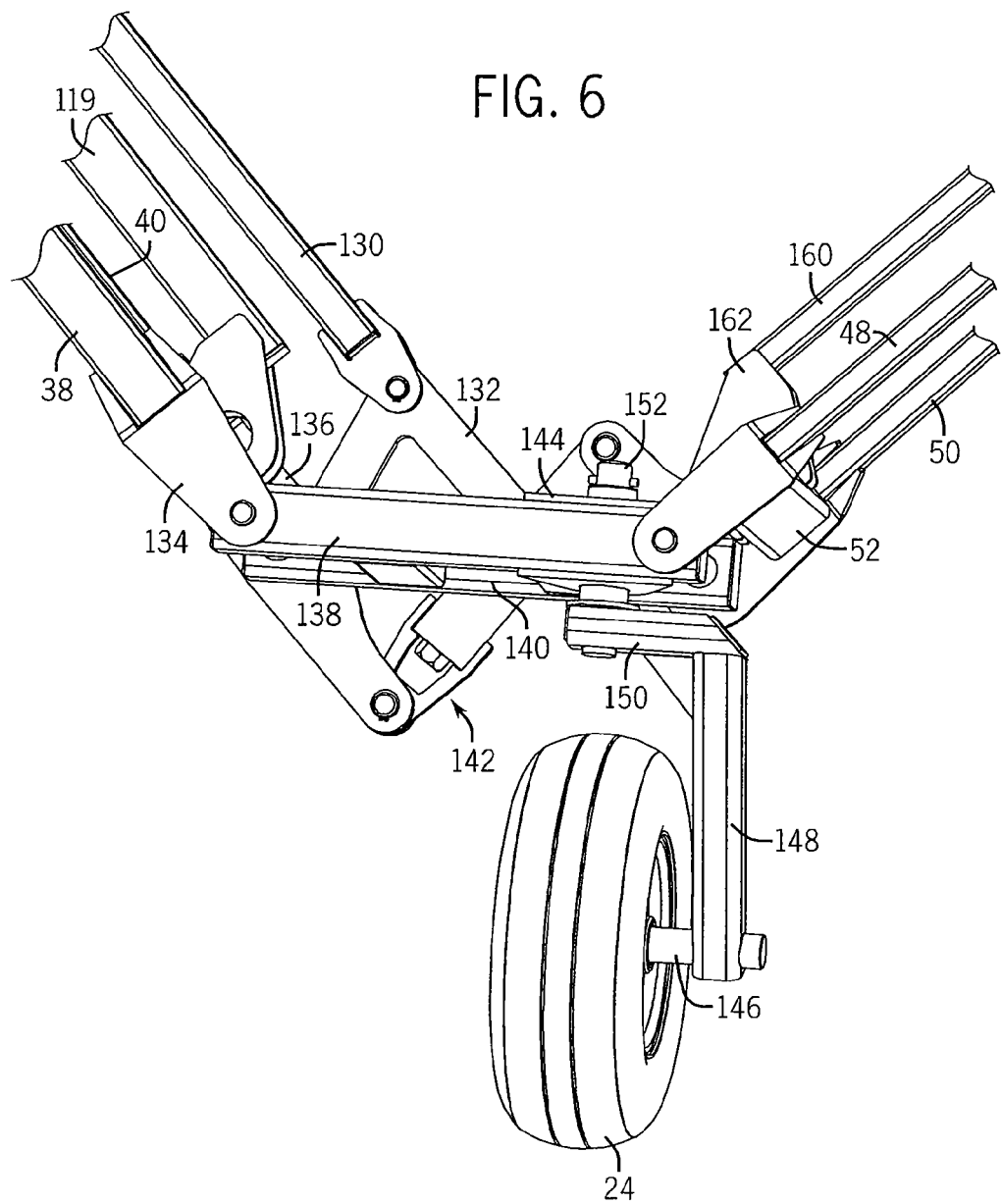
FIG. 6 is a side isometric view of the interconnection of the central frame section, a caster wheel assembly, and an outer frame section of the marker assembly of FIG. 1.
Figure 7:
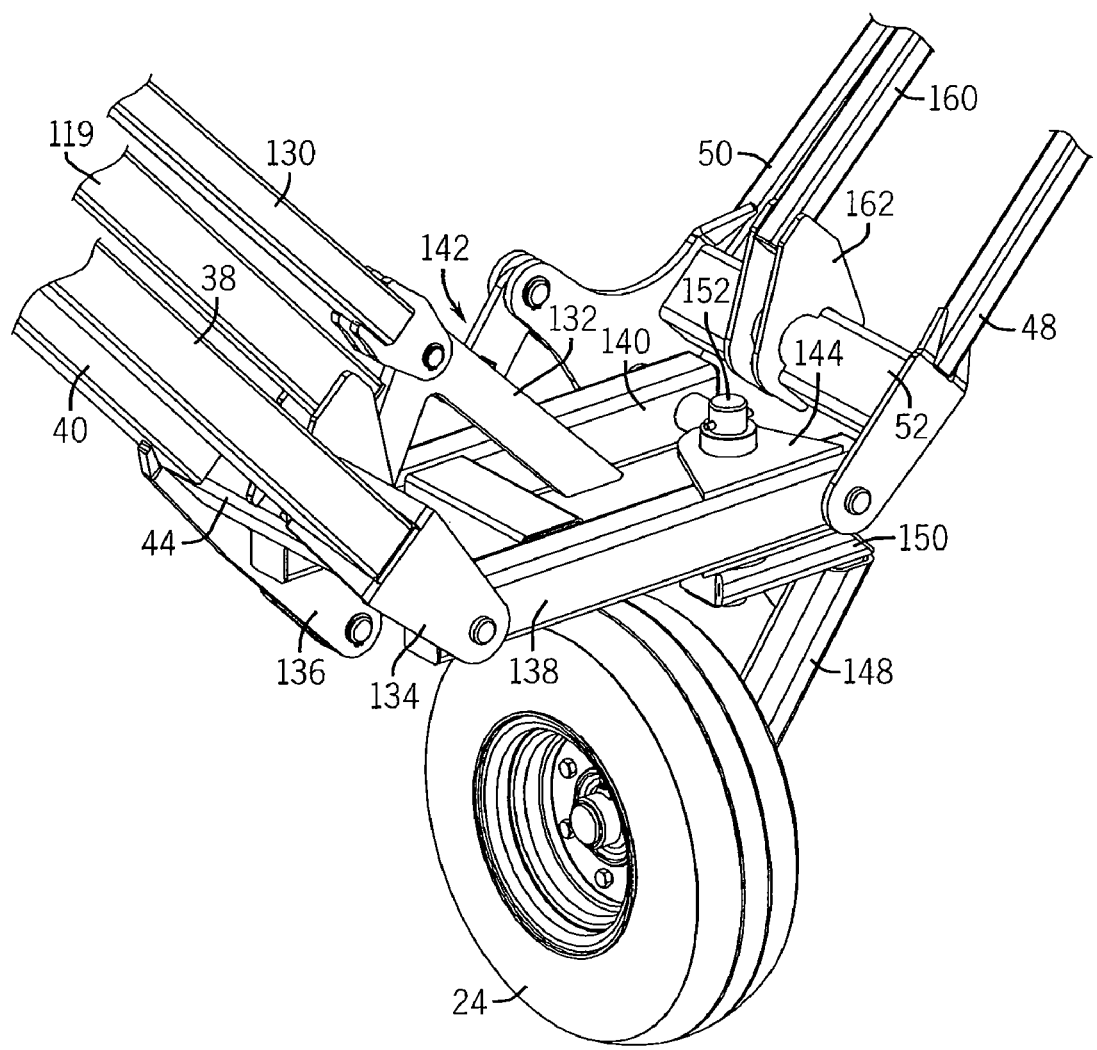
FIG. 7 is a top isometric view of that shown in FIG. 6.

Referring to FIGS. 4 through 6, the central frame section 18 includes tubes 38, 40 which are connected to one another by cross tube 42. Tubes 28 and 38 are interconnected to one another by end plates 120 and 122, respectively. Similarly, tubes 30 and 40 are interconnected to one another by end plates 124 and 126, respectively. The end plates are connected to a common pivot rod 128 in a manner that allows the inner frame section 16 and the central frame section 18 to pivot with respect to one another when the marker assembly 10 is being deployed or retracted.

The central frame section 18 also includes a parallel link 130 that is connected to parallel link 94 by bridge link 96. One skilled in the art will appreciate that link 130 reacts to movement of parallel link 94 during deployment and retraction of the marker assembly.

The parallel link 130 is also connected to a bridge link 132, as shown in FIG. 6. Similarly, tubes 38 and 40 have plates 134 and 136 that are connected to cross tube 44 and to respective tubes 138 and 140 of the wheel mount assembly 20. The bridge link 132 is connected to the outer frame section 22 by a spring linkage 142, which will be described more fully with respect to FIGS. 9 and 10.

Wheel 24 is mounted to a wheel mount 144 that is formed with, or otherwise connected to, tube 138. The wheel 24 has an axle 146 to which an offset arm 148 is connected. The offset arm 148 is in turn connected to a pivot arm 150 that is secured to the wheel mount 144 by a vertical pivot pin 152. The pivot arm 150 is mounted to the pivot pin 152 in a manner that allows the pivot arm 150 to caster freely about the vertical axis defined by the pivot pin 152. This movement of the pivot arm 150 in turn allows the wheel 24 to caster. This is particularly advantageous when the wheel 24 encounters an obstruction to avoid damage to wheel 24 or other components of the marker assembly 10.

Additionally, during deployment of the marker assembly 10, as noted above, the wheel 24 engages the soil surface before the marker assembly 10 is fully deployed. The marker assembly 10 is deployed in a lateral direction, i.e., in a direction perpendicular to the direction of travel of the implement. A conventional wheel is only permitted to rotate along a rotational axis that is perpendicular to the travel direction of the implement and thus during deployment, the wheel is pushed along the soil surface, which can cause damage to the wheel or other components of the marker assembly 10. The present invention, however, allows the wheel 24 to caster and thus, during deployment and when the wheel 24 engages the surface, the wheel 24 can rotate around an axis that is parallel to the direction of travel of the implement to effectively walk the marker assembly to the deployed position. This removes some of the loading on the mount 14 during deployment of the marker assembly 10. Similarly, during retraction of the marker assembly, the wheel 24 can caster to a position to rotate toward the agricultural implement to provide support for the outer and central frame sections until the marker assembly 10 is lifted off the ground by actuator 88.

Referring now to FIG. 8, the outer frame section 22 includes tubes 48, 50 and a telescoping link 56. Retainer 54 includes first and section flanges 154 and 156 to which tubes 48 and 50 are connected. Flange 154 has an opening 158 through which a center tube 160 extends. The center tube 160 is connected to cross tube 52, FIG. 6, by a connecting element 162, FIG. 7, and is connected to flange 156. Flange 156 has an opening (not numbered) through which link 56 may be inserted. The retainer 54 also has a U-bolt 164 that is aligned with the opening in the flange 156 so that the link 56 is passed through the opening (not numbered) defined by the U-bolt 164. Fasteners 166, 168 may be tightened to draw the U-bolt 164 into engagement with the link 56 and secure the link 56 to the flange 156. Marking wheel 26 is connected to a distal end of the link 56.

The construction of the link 56 and retainer 54 allows a user to manually set the point where the link 56 is locked in position. Changing the position where the link 56 is secured to the retainer 54 changes the distance the wheel 26 is from the tubes 48, 50 and thus from the agricultural implement.

Figure 9:
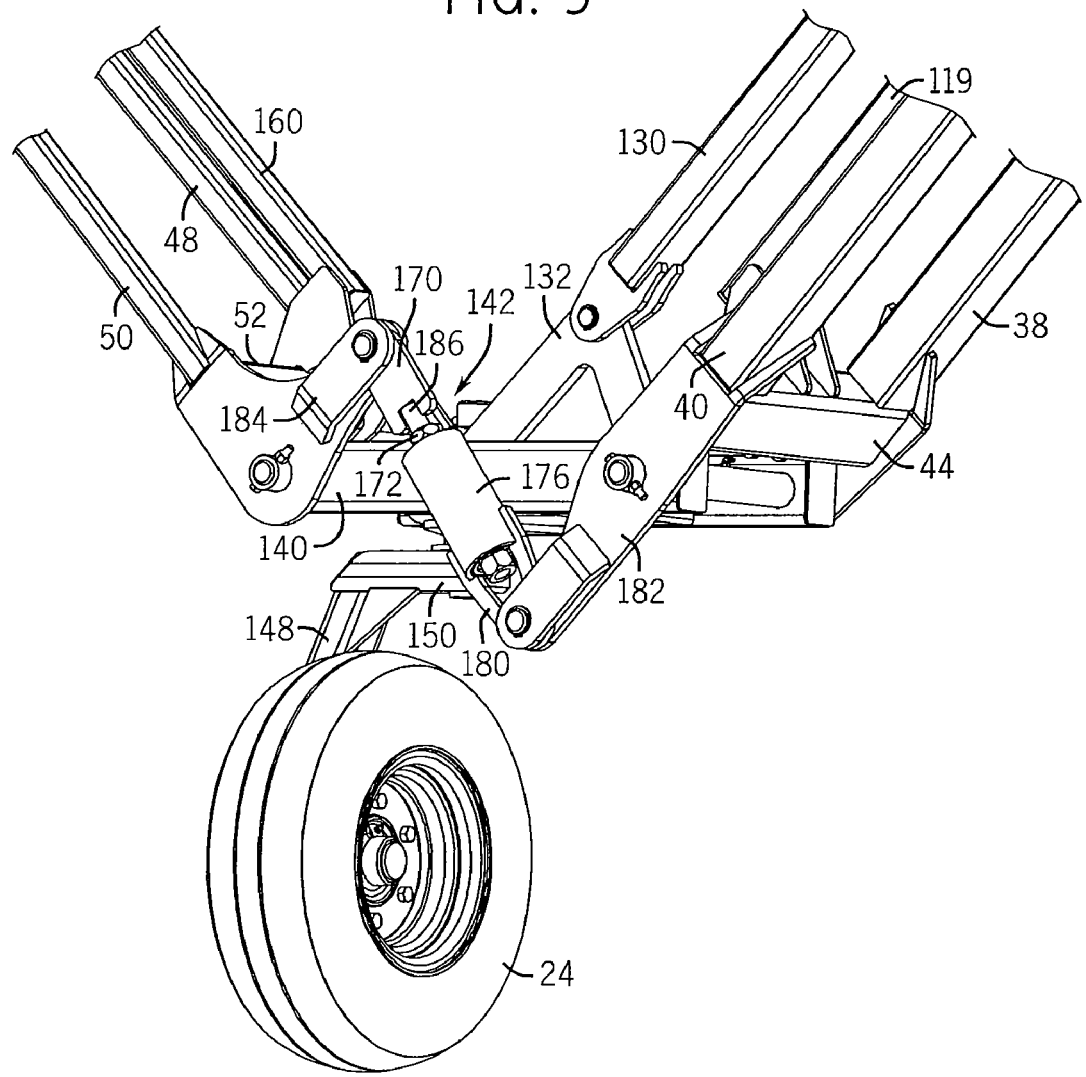
FIG. 9 is a rear isometric view of that shown in FIG. 6.

Referring now to FIGS. 9 and 10, as mentioned above, a spring link 142 interconnects the central frame section 18 and the outer frame section 22. The spring linkage 142 is generally comprised of a rod end 170, catch nuts 172, a compression spring 174 contained within a spring housing 176, compression washers 178, and a cylinder end 180. As shown in FIG. 9, the cylinder end 180 is connected to tube 40 by a connector 182 and the rod end 140 is connected to the outer section linkage 22 by a bracket 184.

The spring 174 is retained by washers 178 within housing 176. A linkage rod 186 passes through the housing 176 and has nuts 172 that are sized to catch the washers 178. If the linkage is compressed or extended, the catch nuts 172 press up against the washers 178, which results in compression of the spring 174. By compressing the spring, a force is applied in the opposite direction as the momentum in the marker assembly during deployment, thereby resulting in a reduction in the momentum in the marker assembly during deployment. It will therefore be appreciated that the spring link 142 allows for rapid deployment of the marker assembly without compromising the outer frame section's ability to follow ground contours.

Additionally, while the marker assembly has been shown and described as being configured to pivot rearwardly at mounting assembly 14, it is understood that the marker assembly could be configured to pivot at other points along its length, such as approximate the marking disc 26.

Many changes and modifications could be made to the invention without departing from the spirit thereof. The scope of these changes will become apparent from the appended claims.

We claim:

1. A marker assembly for use with an agricultural implement, the marker assembly comprising:

a marker frame adapted to be mounted to the agricultural implement, the marker frame adapted to fold against the agricultural implement and extend from the agricultural implement, comprising a mount which includes an inner knuckle and an outer knuckle, the inner knuckle configured to connect at one end to a portion of the agricultural implement, the inner knuckle including an opposite end to which an outer knuckle is connected, the outer knuckle configured to provide a mount for at least a portion of the frame, an inner frame including a first end and a spaced-apart second end, the first end pivotably connected to the outer knuckle, a central frame including a first end and a spaced-apart second end, the first end pivotably connected to the second end of the inner frame, an outer frame including a first end and a spaced-apart second end, the first end pivotably connected to at least a linking portion of the second end of the central frame, the second end of the outer frame including a telescoping rod carrying a rotatable marking disc, a caster wheel assembly including a castor wheel mount frame provided at a junction of the central frame and the outer frame, the caster wheel mount frame including a wheel and an arm which is pivotably mounted to the castor wheel mount frame, the castor wheel mount frame configured to allow the arm with the wheel rotatably connected thereto to caster freely about, a first actuator pivotably connected to a portion of the inner knuckle at a first end and connected to a portion of the agricultural implement at an opposite end, the first actuator configured to move a folded marker frame from an upright folded position to a horizontal stow position for storage, a second actuator pivotably connected to a portion of the first end of the inner frame and pivotably connected at an opposite end thereof to a second end portion of the inner frame, the second actuator configured to move the marker frame between an extended operative position when the second actuator is extended and a folded non-operative position when the second actuator is retracted, at least two movable parallel links, a first parallel link pivotably coupled to a portion of the inner frame and a second parallel link pivotably coupled to a portion of the central frame, the first and second parallel links pivotably connected together such that when the second actuator is extended, the parallel links cooperate to move the inner frame, the central frame, and the outer frame into the extended operative position, and wherein when the second actuator is retracted, the parallel links cooperate to move the inner frame, the central frame, and the outer frame into the folded non-operative position, and a spring linkage having spaced-apart opposing ends and pivotably coupled at least at one end to at least a first rotatable portion which is rotatably connected to the caster wheel mount frame, the first rotatable portion fixedly coupled to at least one frame member, the spring linkage including a rod having a compression spring disposed thereover, the rod configured to provide an area thereon for the spring to compress and de-compress, such that when the spring is compressed during extension and deployment of the marker frame into the operative position, a force is applied to the outer frame in a direction opposite to deployment, thereby reducing a momentum of the outer frame during deployment.

2. The marker assembly of claim 1 wherein the spring linkage is pivotably coupled at an opposite end to a second rotatable portion which is fixedly coupled to at least a second frame member.

3. The marker assembly of claim 2 wherein the first frame member is carried by the central frame and the second frame member is carries by the outer frame.

4. The marker assembly of claim 3 wherein the second rotatable portion is also rotatably coupled to a portion of the wheel frame mount assembly.

5. The marker assembly of claim 4 wherein the first frame member is carried by the central frame and the second frame member is carried by the outer frame.

6. An agricultural implement comprising:

a marker frame adapted to be connected to the frame of the implement, the marker frame adapted to fold against the agricultural implement and extend from the agricultural implement, the marker frame comprising a mount which includes an inner knuckle and an outer knuckle, the inner knuckle configured to connect at one end to a portion of the agricultural implement, the inner knuckle including an opposite end to which an outer knuckle is connected, the outer knuckle configured to provide a mount for at least a portion of the frame;

an inner frame including a first end and a spaced-apart second end, the first end pivotably connected to the outer knuckle;

a central frame including a first end and a spaced-apart second end, the first end pivotably connected to the second end of the inner frame;

an outer frame including a first end and a spaced-apart second end, the first end pivotably connected to at least a linking portion of the second end of the central frame, the second end of the outer frame including a telescoping rod carrying a rotatable marking disc;

a caster wheel assembly including a castor wheel mount frame provided at a junction of the central frame and the outer frame, the caster wheel mount frame including members which are connected together and which cooperate to provide the caster wheel mount frame, the caster wheel mount frame also including a wheel and an arm which is pivotably mounted to the castor wheel mount frame, the castor wheel mount frame configured to allow the arm with the wheel rotatably connected thereto to caster freely about, a first actuator pivotably connected to a portion of the inner knuckle at a first end and connected to a portion of the agricultural implement at an opposite end, the first actuator configured to move a folded marker frame from an upright folded position to a horizontal stow position for storage;

a second actuator pivotably connected to a portion of the first end of the inner frame and pivotably connected at an opposite end thereof to a second end portion of the inner frame, the second actuator configured to move the marker frame between the extended operative position when the second actuator is extended and a folded non-operative position when the second actuator is retracted;

at least two movable parallel links, a first parallel link pivotably coupled to a portion of the inner frame and a second parallel link pivotably coupled to a portion of the central frame, the first and second parallel links pivotably connected together such that when the second actuator is extended, the parallel links cooperate to move the inner frame, the central frame, and the outer frame into the extended operative position, and wherein when the second actuator is retracted, the parallel links cooperate to move the inner frame, the central frame, and the outer frame into the folded non-operative position; and a spring linkage having spaced-apart opposing ends and pivotably coupled at one end to a first rotatable portion which is rotatably connected to the caster wheel mount frame, and pivotably coupled at an opposite end to a second rotatable portion which is also rotatably connected to the caster wheel mount frame, the first and second rotatable portions each fixedly coupled to at least one frame member, the spring linkage including a rod having a compression spring disposed thereover, the rod configured to provide an area thereon for the spring to compress and de-compress, such that when the spring is compressed during extension and deployment of the marker frame into the operative position, a force is applied to the outer frame in a direction opposite to deployment, thereby reducing a momentum of the outer frame during deployment.

7. The agricultural implement of claim 6, wherein the rod extending through the spring has a first end and a second end.

8. The agricultural implement of claim 7 further comprising a first nut mounted adjacent the first end of the rod and adjacent one end of the spring and a second nut mounted adjacent the second end of the rod and adjacent an opposite end of the spring.

9. The agricultural implement of claim 8 further comprising a first washer mounted on the rod between the first nut and the spring and a second washer mounted on the rod between the second nut and the spring.

10. The agricultural implement of claim 9 wherein the spring linkage is configured such that when a force is applied to the spring linkage, one of the nuts will press up against its adjacent washer causing compression of the spring, and wherein the spring linkage further comprises a housing disposed at least partially thereover.

* * * * *